(12) United States Patent
Hui et al.

(10) Patent No.: US 8,624,545 B2
(45) Date of Patent: Jan. 7, 2014

(54) PORTABLE ELECTRONIC DEVICE WITH ANTENNA AND POWER TRANSFER COIL

(75) Inventors: Shu Yuen Ron Hui, Shatin (HK); Quan Xue, Hong Kong (HK); Kwun Chiu Wan, Kowloon (HK)

(73) Assignee: Convenientpower HK Ltd, Shatin, N.T. (HK)

( * ) Notice: Subject to any disclaimer, the term of this patent is extended or adjusted under 35 U.S.C. 154(b) by 641 days.

(21) Appl. No.: 12/576,373

(22) Filed: Oct. 9, 2009

(65) Prior Publication Data

US 2011/0084655 A1    Apr. 14, 2011

(51) Int. Cl.
*H02J 7/00*    (2006.01)

(52) U.S. Cl.
USPC .......................................................... 320/108

(58) Field of Classification Search
USPC .......................................................... 320/108
See application file for complete search history.

(56) References Cited

U.S. PATENT DOCUMENTS

| | | | |
|---|---|---|---|
| 7,164,255 B2 * | 1/2007 | Hui | 320/108 |
| 2004/0198415 A1 * | 10/2004 | Lin et al. | 455/550.1 |
| 2004/0263394 A1 * | 12/2004 | Harano | 343/700 MS |
| 2005/0189910 A1 | 9/2005 | Hui | |
| 2008/0252551 A1 | 10/2008 | Kubo et al. | |
| 2009/0096694 A1 | 4/2009 | Ito et al. | |
| 2009/0108805 A1 | 4/2009 | Liu et al. | |

FOREIGN PATENT DOCUMENTS

| | | |
|---|---|---|
| CA | 2491778 A1 | 7/2005 |
| CN | 101375483 A | 2/2009 |
| CN | 101385039 A | 3/2009 |
| EP | 1552795 A1 | 7/2005 |
| KR | 100900084 B1 | 5/2009 |

OTHER PUBLICATIONS

PCT International Search Report and Written Opinion, PCT Application No. PCT/IB2010/002394, Jan. 20, 2011, 8 pages.
Chinese First Office Action, Chinese Application No. 201080045492.6, Sep. 9, 2013, 15 pages.

* cited by examiner

*Primary Examiner* — Edward Tso
*Assistant Examiner* — Robert Grant
(74) *Attorney, Agent, or Firm* — Fenwick & West LLP

(57) ABSTRACT

The present invention provides a portable electronic device including an antenna having a major planar cross-section, and a power transfer coil having windings parallel to a coil plane, the coil plane extending to the perimeter of the power transfer coil. The antenna and the power transfer coil are arranged such that the major planar cross-section is substantially perpendicular to the coil plane if a line directed perpendicularly from the coil plane intersects the major planar cross-section. An associated method of assembling a portable electronic device is also provided.

17 Claims, 6 Drawing Sheets

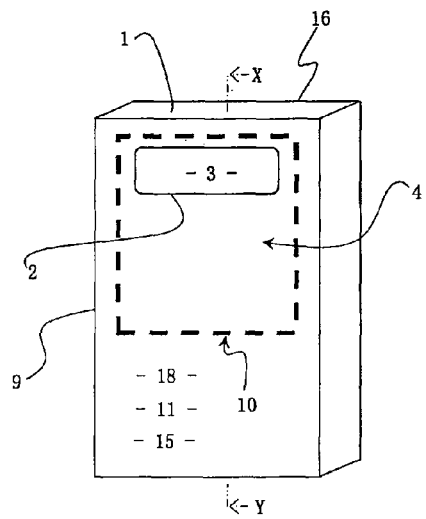
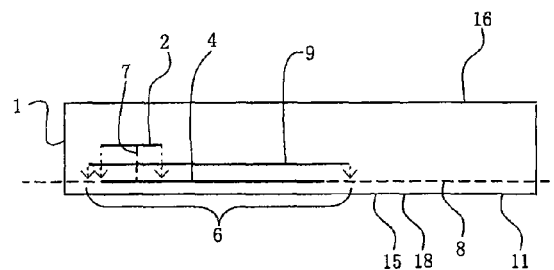
FIG. 5a  FIG. 5b
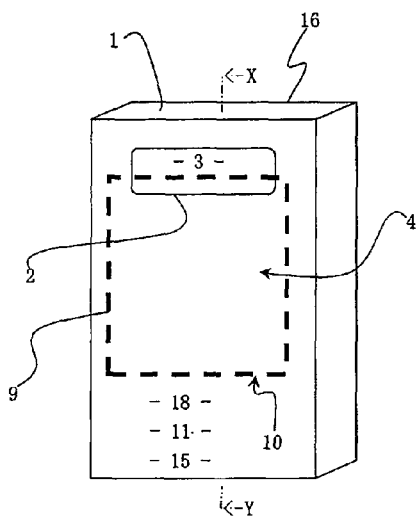
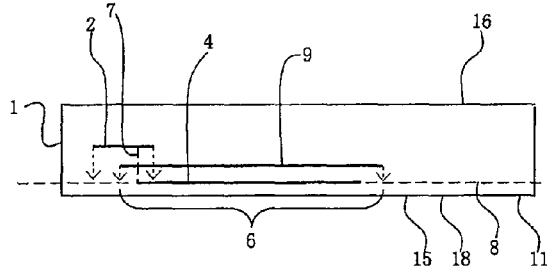
FIG. 6a  FIG. 6b

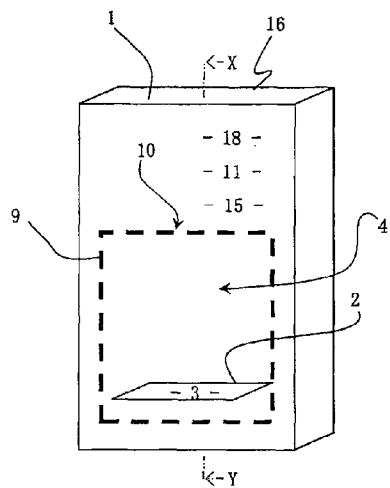 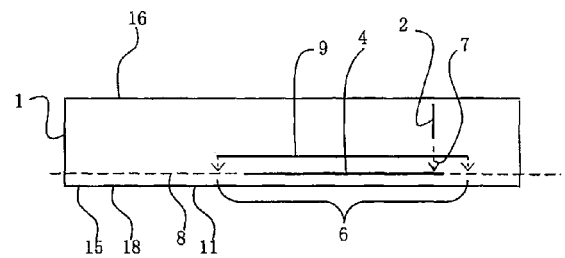
FIG. 7a FIG. 7b
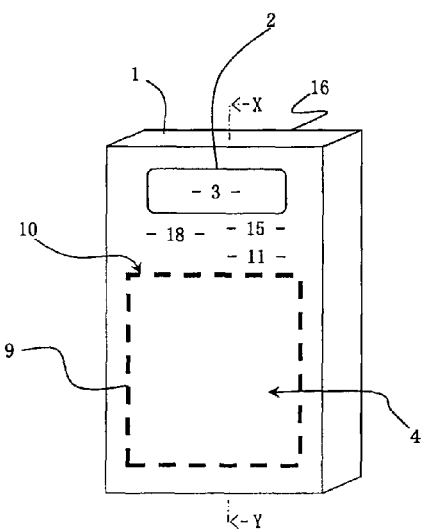 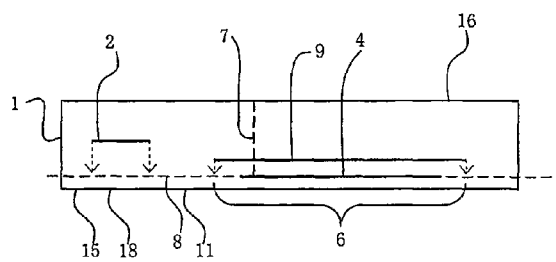
FIG. 8a FIG. 8b

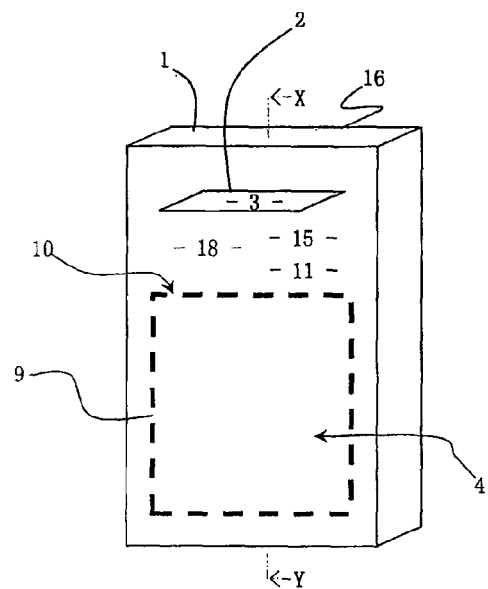
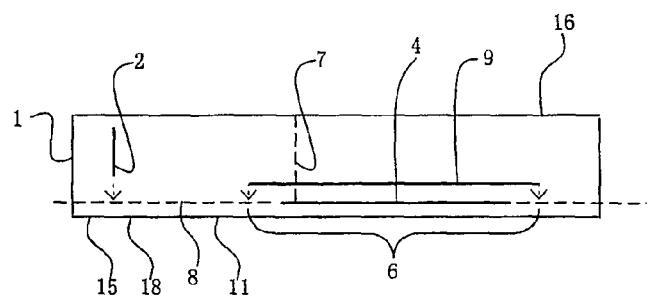
FIG. 9a        FIG. 9b
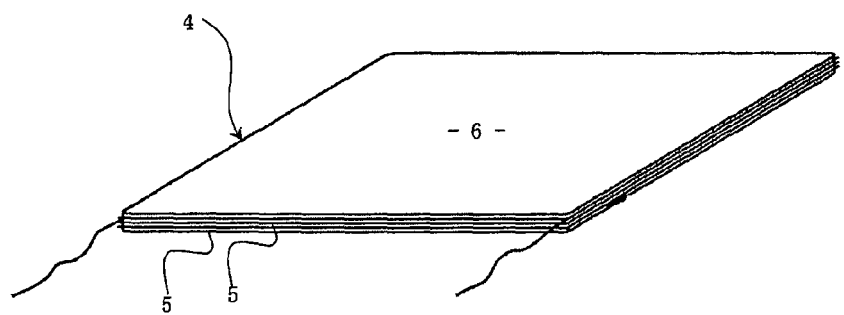
FIG. 10

PORTABLE ELECTRONIC DEVICE WITH ANTENNA AND POWER TRANSFER COIL

FIELD OF THE INVENTION

The present invention relates to portable electronic devices with an antenna and a power transfer coil. The invention will be described in the context of wireless power transfer in which the power transfer coil functions as an energy-receiving coil that wirelessly receives energy in order to, for example, charge a battery included with the portable electronic device. However, it will be appreciated that the invention is not limited to this particular use.

BACKGROUND OF THE INVENTION

Portable electronic devices such as mobile phones and netbook computers include antennas for signal transmission and reception to carry out wireless communication functions. However, in view of the growth of wireless charging technology and increasing research efforts in this technology, it is envisaged that many portable electronic devices, including mobile phones and netbook computers, will be re-designed in the near future to embed an energy-receiving coil for wireless charging purposes.

Thus, portable electronic devices with telecommunication functions will require both an antenna for transmitting and receiving RF signals and an energy-receiving coil, which is also called the secondary coil in a wireless battery charging system. With the associated circuitry, this energy-receiving coil is sometimes called the receiver module. To ensure trouble-free operation, and to meet the wireless charging requirements of industry-wide standards and protocols, future portable devices need to have an antenna and an energy-receiving coil that each work independently without adversely affecting the operation of the other.

An antenna inside a mobile phone, for example, could be in the form of a metal plate. If this metal plate is subject to an AC magnetic field (as one would experience in wireless charging), an eddy current can be induced in the antenna, resulting in unwanted induction heating and a reduction in energy efficiency.

Also, to prevent the charging flux from inducing eddy currents in the metallic parts of the portable electronic devices, some form of electromagnetic (EM) shielding may be required for the energy-receiving coil. However, such EM shielding may reduce the strength of the transmitted and received signal in the antenna.

It is an object of the present invention to overcome or ameliorate at least one of the disadvantages of the prior art, or to provide a useful alternative.

SUMMARY OF THE INVENTION

In one aspect, the present invention provides a portable electronic device including:

an antenna having a major planar cross-section;

a power transfer coil having windings parallel to a coil plane, the coil plane extending to the perimeter of the power transfer coil;

the antenna and the power transfer coil being arranged such that the major planar cross-section is substantially perpendicular to the coil plane if a line directed perpendicularly from the coil plane intersects the major planar cross-section.

In one embodiment, the major planar cross-section is substantially perpendicular to the coil plane regardless of whether a line directed perpendicularly from the coil plane intersects the major planar cross-section.

In another embodiment, no line directed perpendicularly from the coil plane intersects the major planar cross-section.

In a further embodiment, the major planar cross-section is substantially perpendicular to the coil plane and no line directed perpendicularly from the coil plane intersects the major planar cross-section.

Preferably, the portable electronic device includes a signal shield, wherein the orthographic projection of the signal shield onto a projective plane containing the coil plane covers the orthographic projection of the power transfer coil onto the projective plane, the coil plane extending to the perimeter of the orthographic projection of the signal shield onto the projective plane. Also preferably, the power transfer coil and the signal shield form part of a power transfer module.

Preferably, the portable electronic device includes an exterior surface adapted to be positioned adjacent a power transfer surface, wherein magnetic field lines can pass through the power transfer coil substantially perpendicularly to the coil plane thereby to induce a voltage across the power transfer coil. More preferably, the power transfer coil is adjacent and substantially parallel to the exterior surface, the magnetic field lines emanating substantially perpendicularly from the power transfer surface. It is also preferred that the power transfer surface is substantially horizontal and the exterior surface is adapted to rest on top of the power transfer surface.

Preferably, the power transfer coil functions as an energy-receiving coil and the power transfer surface forms part of a wireless charging pad to charge the portable electronic device through the power transfer coil.

Preferably, the exterior surface forms at least a portion of a major exterior face of the portable electronic device. The portable electronic device preferably includes a first face having a user interface and a second face opposite the first face, the second face being the major exterior face.

In another aspect, the present invention provides a method of assembling a portable electronic device, the method including:

providing an antenna having a major planar cross-section;

providing a power transfer coil having windings parallel to a coil plane, the coil plane extending to the perimeter of the power transfer coil;

arranging the antenna and the power transfer coil such that the major planar cross-section is substantially perpendicular to the coil plane if a line directed perpendicularly from the coil plane intersects the major planar cross-section.

In one embodiment, the antenna and the power transfer coil are arranged such that the major planar cross-section is substantially perpendicular to the coil plane regardless of whether a line directed perpendicularly from the coil plane intersects the major planar cross-section.

In another embodiment, the antenna and the power transfer coil are arranged such that no line directed perpendicularly from the coil plane intersects the major planar cross-section.

In a further embodiment, the antenna and the power transfer coil are arranged such that the major planar cross-section is substantially perpendicular to the coil plane and no line directed perpendicularly from the coil plane intersects the major planar cross-section.

Preferably, the method includes providing a signal shield, wherein the orthographic projection of the signal shield onto a projective plane containing the coil plane covers the orthographic projection of the power transfer coil onto the projective plane, the coil plane extending to the perimeter of the orthographic projection of the signal shield onto the projective plane. Also preferably, the power transfer coil and the signal shield are provided as part of a power transfer module.

Preferably, the portable electronic device is provided with an exterior surface adapted to be positioned adjacent a power transfer surface, wherein magnetic field lines can pass through the power transfer coil substantially perpendicularly to the coil plane thereby to induce a voltage across the power transfer coil. More preferably, the power transfer coil is located adjacent and substantially parallel to the exterior surface, the magnetic field lines emanating substantially perpendicularly from the power transfer surface. It is also preferred that the power transfer surface is positioned substantially horizontally and the exterior surface is adapted to rest on top of the power transfer surface.

Preferably, the power transfer coil is operated as an energy-receiving coil and the power transfer surface forms part of a wireless charging pad to charge the portable electronic device through the power transfer coil.

Preferably, the exterior surface is provided as at least a portion of a major exterior face of the portable electronic device. The portable electronic device is preferably provided with a first face having a user interface and a second face opposite the first face, the second face being the major exterior face.

BRIEF DESCRIPTION OF THE FIGURES

Preferred embodiments in accordance with the best mode of the present invention will now be described, by way of example only, with reference to the accompanying figures, in which:

FIG. 5a is a schematic diagram of a portable electronic device, also in the form of a mobile phone, having an antenna and a power transfer coil in an undesirable arrangement;

FIG. 5b is a cross-section of the portable electronic device of FIG. 5a taken along line X-Y shown in FIG. 5a;

FIG. 6a is a schematic diagram of a portable electronic device, again in the form of a mobile phone, having an antenna and a power transfer coil in another undesirable arrangement;

FIG. 6b is a cross-section of the portable electronic device of FIG. 6a taken along line X-Y shown in FIG. 6a;

FIG. 7a is a schematic diagram of a portable electronic device, in the form of a mobile phone, in accordance with an embodiment of the present invention;

FIG. 7b is a cross-section of the portable electronic device of FIG. 7a taken along line X-Y shown in FIG. 7a;

FIG. 8a is a schematic diagram of a portable electronic device, also in the form of a mobile phone, in accordance with another embodiment of the present invention;

FIG. 8b is a cross-section of the portable electronic device of FIG. 8a taken along line X-Y shown in FIG. 8a;

FIG. 9a is a schematic diagram of a portable electronic device, again in the form of a mobile phone, in accordance with a further embodiment of the present invention;

FIG. 9b is a cross-section of the portable electronic device of FIG. 9a taken along line X-Y shown in FIG. 9a;

FIG. 10 is a schematic diagram of a power transfer coil in an embodiment of the present invention;

DETAILED DESCRIPTION OF THE BEST MODE OF THE INVENTION

Figure 1:
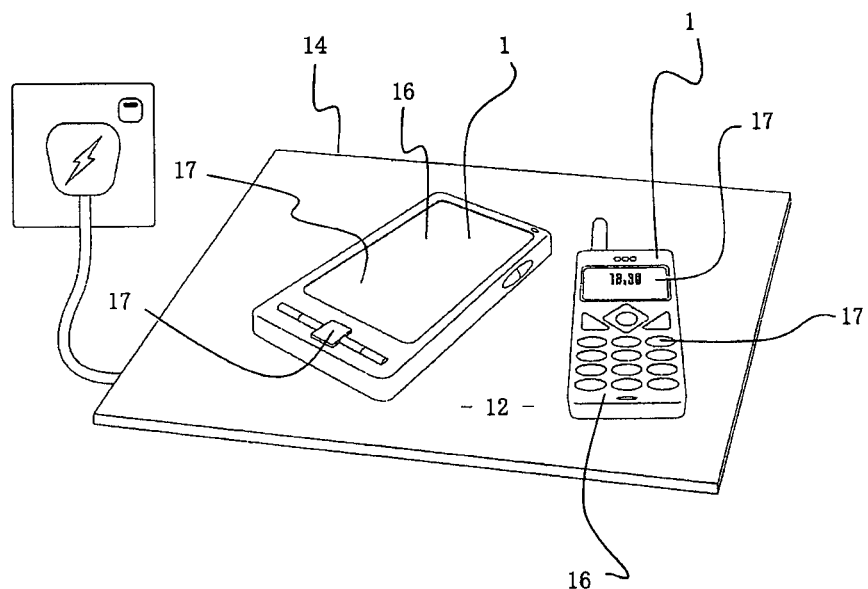
FIG. 1 is a schematic diagram of a wireless battery charging system for use with portable electronic devices such as those of embodiments of the present invention.
Figure 2:
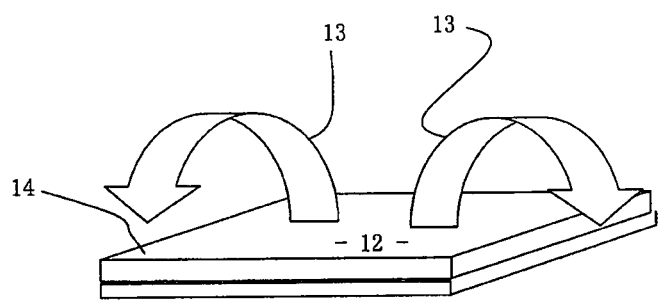
FIG. 2 is a schematic diagram of the wireless battery charging pad of the system shown in FIG. 1.

Referring to the figures, a portable electronic device 1 is provided in accordance with the present invention. The portable electronic device includes an antenna 2 having a major planar cross-section 3, and a power transfer coil 4 having windings 5 parallel to a coil plane 6, the coil plane extending to the perimeter of the power transfer coil. The antenna 2 and the power transfer coil 4 are arranged such that the major planar cross-section 3 is substantially perpendicular to the coil plane 6 if a line 7 directed perpendicularly from the coil plane 6 intersects the major planar cross-section 3.

Put another way, the antenna 2 and the power transfer coil 4 are arranged such that the major planar cross-section 3 is substantially perpendicular to the coil plane 6 if the coil plane overlaps the orthographic projection of the major planar cross-section 3 onto a projective plane 8 containing the coil plane 6.

In some embodiments, such as the embodiment shown in FIGS. 7a and 7b, the major planar cross-section 3 is substantially perpendicular to the coil plane 6 regardless of whether a line 7 directed perpendicularly from the coil plane 6 intersects the major planar cross-section 3. In other embodiments, such as the embodiment shown in FIGS. 8a and 8b, no line 7 directed perpendicularly from the coil plane 6 intersects the major planar cross-section 3.

It will be appreciated that in further embodiments, such as the embodiment shown in FIGS. 9a and 9b, the major planar cross-section 3 is substantially perpendicular to the coil plane 6 and no line 7 directed perpendicularly from the coil plane 6 intersects the major planar cross-section 3. Thus, these embodiments combine the embodiments exemplified in FIGS. 7a, 7b, 8a and 8b.

In other words, in embodiments of the type shown in FIGS. 7a and 7b, the antenna 2 and the power transfer coil 4 are arranged such that the major planar cross-section 3 is substantially perpendicular to the coil plane 6 regardless of whether the coil plane overlaps the orthographic projection of the major planar cross-section 3 onto the projective plane 8. In embodiments of the type shown in FIGS. 8a and 8b, the antenna 2 and the power transfer coil 4 are arranged such that the coil plane 6 does not overlap the orthographic projection of the major planar cross-section 3 onto the projective plane 8. In the embodiments shown in FIGS. 9a and 9b, the antenna 2 and the power transfer coil 4 are arranged such that the coil plane 6 does not overlap the orthographic projection of the major planar cross-section 3 onto the projective plane 8 and the major planar cross-section 3 is substantially perpendicular to the coil plane 6.

The portable electronic device 1 further includes a signal shield 9. The orthographic projection of the signal shield 9 onto the projective plane 8 containing the coil plane 6 covers the orthographic projection of the power transfer coil 4 onto the projective plane 8. Where such a signal shield is included, the coil plane 6 extends to the perimeter of the orthographic projection of the signal shield onto the projective plane 8.

In other words, the signal shield 9 has a position and an extent to shield against any magnetic field that passes through the power transfer coil 4. As such, the signal shield 9 can function to shield the other components in the portable electronic device to minimise the formation of eddy currents in those other components. Preferably, the power transfer coil 4 and the signal shield 9 form part of a power transfer module 10.

The portable electronic device 1 includes an exterior surface 11 adapted to be positioned adjacent a power transfer surface 12. When so positioned, magnetic field lines 13 can pass through the power transfer coil 4 substantially perpendicularly to the coil plane 6 thereby to induce a voltage across the power transfer coil. In the present embodiments, the power transfer coil 4 is adjacent and substantially parallel to the exterior surface 11, and the magnetic field lines 13 emanate substantially perpendicularly from the power transfer surface 12. Further, the power transfer surface 12 is substantially horizontal and the exterior surface 11 is adapted to rest on top of the power transfer surface 12.

The power transfer coil 4, of the present embodiments, functions as an energy-receiving coil and the power transfer surface 12 forms part of a wireless charging pad 14 to charge the portable electronic device 1 through the power transfer coil. Thus, the power transfer module 10 functions as an energy-receiving module in these embodiments. It will be appreciated that in other embodiments, the power transfer coil 4 can also function to transmit energy as an energy-transmitting coil, which can form part of an energy-transmitting module, which in turn can include, for example, a signal shield similar to the signal shield 9. In particular, power is transferred, that is, received or transmitted, wirelessly through inductive coupling, for example, with another power transfer coil. The power transfer coil 4 can also function to communicate wirelessly through inductive coupling.

Figure 11:
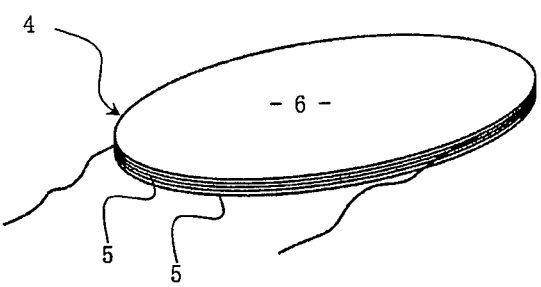
FIG. 11 is a schematic diagram of a power transfer coil in another embodiment of the present invention.
Figure 12:
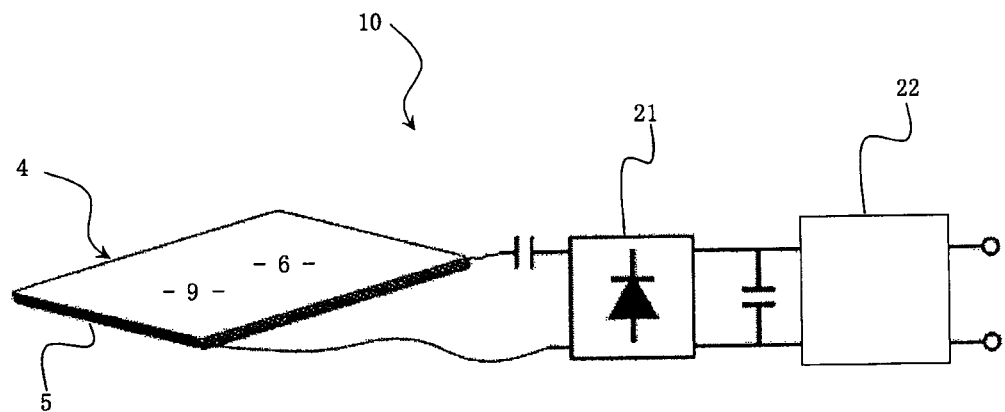
FIG. 12 is a schematic diagram of a power transfer module in an embodiment of the present invention.

The shape of the power transfer coil 4 and the power transfer module 10 can be circular, rectangular or any polygonal shape. FIGS. 10, 11 and 12 show some embodiments.

The exterior surface 11 forms at least a portion of a major exterior face 15 of the portable electronic device 1. In some embodiments, such as the present embodiments, the portable electronic device 1 includes a first face 16 having a user interface 17 and a second face 18 opposite the first face, the second face being the major exterior face 15. Thus, the portable electronic device 1 can still be used during wireless power transfer, such as charging, through the power transfer coil 4.

For example, where the portable electronic device 1 is in the form of a mobile phone, the first face 16 is the front of the mobile phone and the second face 18 is the back of the mobile phone. Furthermore, the user interface 17 is, for example, a screen and a keypad, which are typically included with mobile phones. In another example, the portable electronic device 1 is in the form of a portable computer, such as a netbook computer, and the first face 16 is the top of the portable computer and the second face 18 is the underside of the portable computer. The user interface 17 can be, for example, a keyboard or a touchpad.

The embodiments of the portable electronic devices 1 described have one antenna 2 and one power transfer coil 4. Other embodiments can have a plurality of the antennas 2 and a plurality of the power transfer coils 4. Preferably, in these embodiments, each antenna 2 is arranged relative to each power transfer coil 4 as described above.

Figure 3:
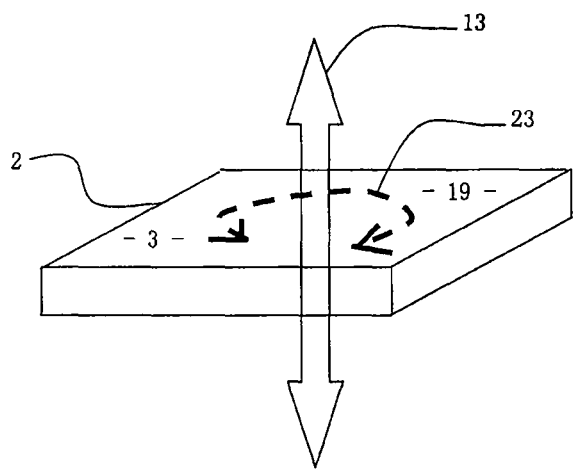
FIG. 3 is a schematic diagram of the formation of an induced (or eddy) current in a metallic plate placed in a changing (AC) magnetic field, the metallic plate defining an antenna in an embodiment of the present invention.
Figure 4A:
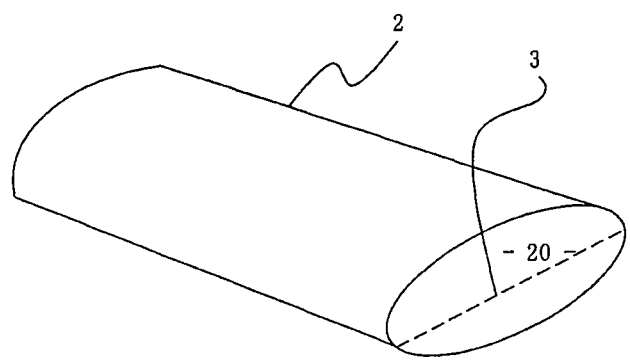
FIGS. 4a and 4b is a schematic diagram of an antenna in another embodiment of the present invention.
Figure 4B:
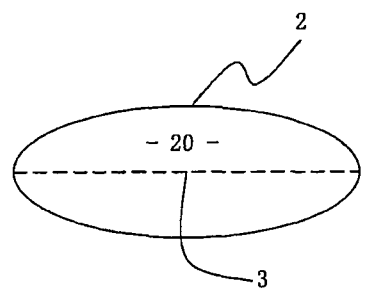

The antenna 2 of the present embodiments is in the form of a metallic plate, having a planar face 19 of a width and a length that are relatively larger than a thickness of the plate, as best shown in FIG. 3. In particular, the major planar cross-section 3 is a planar cross-section parallel to the face 19. The antenna 2 of other embodiments can be of various shapes. For example, FIG. 4 shows an antenna 2 in the form of an oval cylinder, having a planar oval transverse cross-section 20 along a longitudinal axis. The length of the cylinder along the longitudinal axis is relatively larger than the major axis of the planar oval transverse cross-section 20. Thus, in this case, the major planar cross-section 3 is the longitudinal planar cross-section through the major axis of the oval cross-section 20.

A particular embodiment of the invention will now be described in further detail. Specifically, the portable electronic device 1 takes the form of a mobile phone, which is adapted to be charged wirelessly by the wireless charging pad 14.

The power transfer coil 4 of this embodiment is square-shaped, having windings 5 wound parallel to and defining a square coil plane 6. The signal shield 9 is included and extends to the perimeter of the power transfer coil 4. In this embodiment, the power transfer coil 4 functions as an energy-receiving coil to inductively, and therefore wirelessly, receive power from the wireless charging pad 14. The power transfer coil 4 and the signal shield 9 form the power transfer module 10, operating as an energy-receiving module. In this embodiment, the power transfer module 10 also includes a rectifier 21, such as a diode or a synchronous rectifier, and a voltage regulator 22, which can be embedded in a charging circuit of a battery in the mobile phone.

The wireless charging pad 14 generates an AC magnetic flux in such a way that the lines of flux, or magnetic field lines, leave the power transfer surface 12 vertically. This can be referred to as the "vertical flux" approach. In this embodiment, the power transfer surface 12 is in the form of a planar charging surface. If a metallic plate, such as the antenna 2, is placed on the charging surface 12, the flux will flow through the metallic plate vertically as shown in FIG. 12. This results in an induced (or eddy) current 23 in the metallic plate, which leads to induction heating and energy loss, as shown in FIG. 3.

This is why, in this embodiment, the major planar cross-section 3 of the antenna 2 should not be placed in the vertical path of the magnetic filed lines 13 which pass through the power transfer coil 4. This is also why the signal shield 9, in the form of, for example, an electromagnetic (EM) shield, is usually needed to shield the power transfer coil 4. In this way, the flux will not induce current in other metallic parts inside the portable electronic device 1.

As discussed above, the presence of the electromagnetic signal shield 9 for the power transfer coil 4 poses another problem for the antenna 2 since the shielding material of the signal shield 9 will also shield the signal transmitted from or received by the antenna 2. The electromagnetic signal shield 9 can cover a larger area than the power transfer coil 4.

Thus, as described above, in some embodiments of the present invention, the antenna 2 and the power transfer coil 4 are placed away from each other such that the coil plane 6 does not overlap the orthographic projection of the major planar cross-section 3 onto the projective plane 8, which contains the coil plane 6. Similarly, in embodiments with the signal shield 9, the antenna 2 and the signal shield 9 are placed away from each other such that the orthographic projection of the signal shield onto the projective plane 8 does not overlap the orthographic projection of the major planar cross-section 3 onto the projective plane 8.

In other embodiments of the invention, also as described above, the antenna 2 and the power transfer coil 4 are arranged such that the major planar cross-section 3 and the coil plane 6 are perpendicular. In this way, the vertical AC flux generated perpendicularly through the coil plane 6 of power transfer coil 4 will not flow vertically into the major planar cross-section 3 of the antenna 2. Hence, minimal eddy currents will be induced by the AC flux in the antenna 2.

Also as described above, in further embodiments of the invention, if the major planar cross-section 3 and the coil plane 6 are perpendicular, the antenna 2 and the power transfer coil 4 can be placed inside the mobile phone with or without overlap of the coil plane 6 and the orthographic projection of the major planar cross-section 3 onto the projective plane 8, which contains the coil plane 6. It will be appreciated, of course, that the more desirable arrangement is to have the major planar cross-section 3 perpendicular to the coil plane 6 without overlap of the coil plane 6 and the orthographic projection of the major planar cross-section 3 onto the projective plane 8.

Undesirable arrangements of the antenna 2 and the power transfer coil 4 are shown in FIGS. 5a, 5b, 6a and 6b. The figures show total overlap and partial overlap of the major planar cross-section 3 of the antenna 2 and the coil plane 6, when the major planar cross-section 3 is orthographically projected onto the projective plane 8. In these Figures, the antenna 2 and the power transfer coil 4 are substantially parallel. However, if there is the type of overlap mentioned above, the same problems arise whenever the major planar cross-section 3 is not oriented perpendicularly to the coil plane 6.

In these undesirable arrangements, the electromagnetic signal shield 9 may partially shield the antenna 2 from transmitting and receiving signals. The AC flux for wireless charging will also induce current in the antenna 2.

The present invention also provides, in another aspect, a method of assembling a portable electronic device. In a preferred embodiment, the method is for assembling the portable electronic device 1 described above. More particularly, the method includes providing the antenna 2 having the major planar cross-section 3, and providing the power transfer coil 4 having windings 5 parallel to the coil plane 6, the coil plane extending to the perimeter of the power transfer coil. The method further includes arranging the antenna 2 and the power transfer coil 4 such that the major planar cross-section 3 is substantially perpendicular to the coil plane 6 if a line 7 directed perpendicularly from the coil plane 6 intersects the major planar cross-section 3.

In some embodiments of the method, the antenna 2 and the power transfer coil 4 are arranged such that the major planar cross-section 3 is substantially perpendicular to the coil plane 6 regardless of whether a line 7 directed perpendicularly from the coil plane 6 intersects the major planar cross-section 3. In other embodiments of the method, the antenna 2 and the power transfer coil 4 are arranged such that no line 7 directed perpendicularly from the coil plane 6 intersects the major planar cross-section 3. In further embodiments, the antenna 2 and the power transfer coil 4 are arranged such that the major planar cross-section 3 is substantially perpendicular to the coil plane 6 and no line 7 directed perpendicularly from the coil plane 6 intersects the major planar cross-section 3.

The method, in the present embodiment, also includes providing the signal shield 9. As described above, the orthographic projection of the signal shield 9 onto the projective plane 8 containing the coil plane 6 covers the orthographic projection of the power transfer coil 4 onto the projective plane 8, and the coil plane 6 extends to the perimeter of the orthographic projection of the signal shield 9 onto the projective plane 8. Preferably, the power transfer coil 4 and the signal shield 9 are provided as part of the power transfer module 10.

The present embodiment also includes providing the portable electronic device 1 with the exterior surface 11, which is adapted to be positioned adjacent the power transfer surface 12, wherein the magnetic field lines 13 can pass through the power transfer coil 4 substantially perpendicularly to the coil plane 6 thereby to induce a voltage across the power transfer coil. The embodiment includes positioning the power transfer coil 4 adjacent and substantially parallel to the exterior surface 11. Similar to above, the magnetic field lines 13, in this embodiment, emanate substantially perpendicularly from the power transfer surface 12. As above, the power transfer surface 12 is substantially horizontal and the exterior surface 11 is adapted to rest on top of the power transfer surface. Also, the power transfer coil 4 functions as an energy-receiving coil and the power transfer surface 12 forms part of the wireless charging pad 14 to charge the portable electronic device 1 through the power transfer coil 4.

In the present embodiment, the exterior surface 11 provided with the electronic device forms at least a portion of the major exterior face 15 of the portable electronic device 1. The portable electronic device 1 is also provided with the first face 16 having the user interface 17 and the second face 18 opposite the first face, the second face being the major exterior face 15.

Other embodiments of the method include features that are evident from the foregoing description of various embodiments of the portable electronic device 1. These include, for example, providing the other features of the portable electronic device 1 and arranging the features as detailed above in respect of the various embodiments of the portable electronic device 1.

Referring to the foregoing, it will be appreciated that the present invention addresses the problems and disadvantages of the prior art discussed above.

Although the invention has been described with reference to specific examples, it will be appreciated by those skilled in the art that the invention can be embodied in many other forms. It will also be appreciated by those skilled in the art that the features of the various examples described can be combined in other combinations.

What is claimed is:

1. A portable electronic device including:
   an antenna having a first surface and a second surface arranged parallel to the first surface, the antenna also having a major planar cross-section parallel to the first surface;
   a power transfer coil arranged to receive energy transmitted through a power transfer surface that is external to the portable electronic device, the power transfer coil having windings parallel to a coil plane, the power transfer coil arranged such that the received energy passes through the power transfer coil in a direction substantially perpendicular to the coil plane and does not flow vertically into the major planar cross-section, the power transfer coil further arranged such that the major planar cross-section is substantially perpendicular to the coil plane; and
   a signal shield arranged between the antenna and the power transfer coil such that the major planar cross-section overlaps the signal shield, the signal shield further arranged parallel to the power transfer coil and perpendicular to the major planar cross-section.

2. A portable electronic device according to claim 1 wherein the major planar cross-section is positioned to overlap the coil plane.

3. A portable electronic device according to claim 1, wherein an orthographic projection of the signal shield onto a projective plane containing the coil plane covers an orthographic projection of the power transfer coil onto the projective plane, the coil plane extending to the perimeter of the orthographic projection of the signal shield onto the projective plane.

4. A portable electronic device according to claim 3 wherein the power transfer coil and the signal shield form part of a power transfer module.

5. A portable electronic device according to claim 1 including an exterior surface adapted to be positioned adjacent to the power transfer surface.

6. A portable electronic device according to claim 5 wherein the power transfer coil is adjacent and substantially parallel to the exterior surface.

7. A portable electronic device according to claim 5 wherein the power transfer surface is substantially horizontal and the exterior surface is adapted to rest on top of the power transfer surface.

8. A portable electronic device according to claim 7 wherein the power transfer coil functions as an energy-receiving coil and the power transfer surface forms part of a wireless charging pad to charge the portable electronic device through the power transfer coil.

9. A portable electronic device according to claim 5 wherein the exterior surface forms at least a portion of a major exterior face of the portable electronic device.

10. A portable electronic device according to claim 9 including a first face having a user interface and a second face opposite the first face, the second face being the major exterior face.

11. A method of assembling a portable electronic device, the method including:
   providing an antenna having a first surface and a second surface arranged parallel to the first surface, the antenna also having a major planar cross-section parallel to the first surface;
   providing a power transfer coil arranged to receive energy through a power transfer surface that is external to the portable electronic device, the power transfer coil having windings parallel to a coil plane, the power transfer coil arranged such that the received energy passes through the power transfer coil in a direction substantially perpendicular to the coil plane and does not flow vertically into the major planar cross-section, the power transfer coil further arranged such that the major planar cross-section is substantially perpendicular to the coil plane; and
   arranging a signal shield between the antenna and the power transfer coil such that the major planar cross-section overlaps the signal shield, the signal shield further arranged parallel to the power transfer coil and perpendicular to the major planar cross-section.

12. A method according to claim 11 wherein the antenna and the power transfer coil are arranged such that the major planar cross-section is positioned to overlap the coil plane.

13. A method according to claim 11, wherein an orthographic projection of the signal shield onto a projective plane containing the coil plane covers an orthographic projection of the power transfer coil onto the projective plane, the coil plane extending to the perimeter of the orthographic projection of the signal shield onto the projective plane.

14. A method according to claim 13 wherein the power transfer coil and the signal shield are provided as part of a power transfer module.

15. A portable electronic device including:
   a plate antenna having a major planar cross-section parallel to a face of the antenna;
   a power transfer coil arranged to receive energy transmitted through a power transfer surface that is external to the portable electronic device, the power transfer coil having windings parallel to a coil plane, the power transfer coil arranged such that the received energy passes through the power transfer coil in a direction substantially perpendicular to the coil plane and does not flow vertically into the major planar cross-section, the power transfer coil further arranged such that the major planar cross-section is substantially perpendicular to the coil plane; and
   a signal shield arranged between the antenna and the power transfer coil, the signal shield further arranged parallel to the power transfer coil and perpendicular to the major planar cross-section.

16. The portable electronic device of claim 15, wherein the antenna and the power transfer coil are arranged such that the major planar cross-section is substantially perpendicular to the coil plane.

17. The portable electronic device of claim 1, wherein the signal shield is further arranged between the antenna and the power transfer coil such that the major planar cross-section overlaps the signal shield along an axis of the coil plain.

* * * * *